United States Patent Office 3,196,118
Patented July 20, 1965

3,196,118
COATING COMPOSITIONS CONTAINING AN AMINE AND A METALLIC DRIER
Christian J. A. Peters, Drexel Hill, Pa., assignor to E. I. du Pont de Nemours and Company, Wilmington, Del., a corporation of Delaware
No Drawing. Filed Sept. 18, 1962, Ser. No. 224,507
8 Claims. (250—22)

This invention relates to air-drying coating compositions and particularly to shortening the time required for air-drying, i.e. the spontaneous conversion or curing of a coating of paint or the like, by an oxygen-induced reaction to a condition in which the dried coating is no longer soluble in ordinary solvent for the original liquid coating composition. Such air-drying, in the instant invention as in the paint art, is most easily effected by exposing a brushed, sprayed or otherwise applied coating to the atmosphere (oxygen) at normal temperatures of about 40°–100° F.

The improvement of shortened air-drying time provided by this invention is effected by incorporating as an accelerator in the liquid paint or like material a tertiary alkyl primary amine compound having the following structural formula:

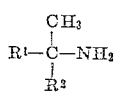

in which $R^1$ is a $C_1$–$C_5$ alkyl radical, and
$R^2$ is a radical selected from the class consisting of $C_1$–$C_{18}$ alkyl, $C_2$–$C_{18}$ alkenyl and benzyl.

The following species represent this class of tertiary alkyl primary amine:

1-amino-1,1-dimethyl ethane, i.e., t-butyl amine
2-amino-2,4,4-trimethyl pentane, i.e., t-octyl amine
Amino methyl benzyl octadecyl methane
Amino dimethyl oleyl methane The proportion of such substituted amine added as an accelerator is about 0.05%–1%, preferably 0.1%–0.5%, based on the weight of organic film-forming material present in the composition.

Of the above described class of amines, a preferred species is 2-amino-2,4,4-trimethylpentane because of its availability, low cost and high order of activity in accelerating air-drying.

An essential organic film-forming component of the coating compositions of this invention is a compound containing a plurality of 1,3-cyclic acetal radicals having in the 2-position an alpha-methylenically unsaturated substituent. A wide variety of such compounds is disclosed in U.S. Patents 3,010,918 and 3,010,923, and the compounds of these patents are useful as film-forming materials in this invention.

A preferred class of such acetal compound for use in this invention is polycarboxylic acid esters containing a plurality of monovalent 2-vinyl-1,3-dioxolanyl radicals, because they dry fast, have excellent coating properties and are easy and economical to make. The following compounds are representative of this preferred class:

Bis-[(2-vinyl-1,3-dioxolan-4-yl) butyl]orthophthalate
Bis-[(2-vinyl-1,3-dioxolan-4-yl) butyl]itaconate
Bis-[(2-vinyl-1,3-dioxolan-4-yl) butyl]maleate
Bis-[(2-vinyl-1,3-dioxolan-4-yl) butyl]fumarate
Bis-[2-vinyl-1,3-dioxolan-4-yl) butyl]terephthalate
Bis-[(2-vinyl-1,3-dioxolan-4-yl) butyl]mesaconate
Tetrakis-[(2-vinyl-1,3-dioxolan-4-yl) butyl]pyromellitate
Tris-[(2-vinyl-1,3-dioxolan-4-yl) butyl]propane tricarboxylate
Bis-[(2-vinyl-1,3-dioxolan-4-yl) butyl]hexahydrophthalate
Bis-[(2-vinyl-1,3-dioxolan-4-yl) propyl]citraconate
Tris-[(2-vinyl-1,3-dioxolan-4-yl) propyl]trimellitate
Bis-[(2-vinyl-1,3-dioxolan-4-yl) propyl]isophthalate
Bis-[(2-vinyl-1,3-dioxolan-4-yl) methyl]maleate
Bis-[(2-vinyl-1,3-dioxolan-4-yl) methyl]glutarate
Bis-[(2-vinyl-1,3-dioxolan-4-yl) methyl]adipate Within the above mentioned preferred class a further preferred class is dicarboxylic acid diesters having two monovalent 2-vinyl-1,3-dioxolanyl radicals, several representative species of which are set forth above. These are especially preferred because they have the earlier mentioned characteristics in a high degree and have a relatively low viscosity generally like raw linseed oil.

Another kind of compound containing a plurality of acetal groups as described above which is useful as an essential film-former in this invention is a linear polymer having such acetal groups as extralinear substituents which are pendent from the main polymer chain. Such polymers can be prepared for example by transesterifying (a) a readily soluble preformed vinyl addition polymer having extralinear carbalkoxy groups (preferably $C_2$–$C_5$ carbalkoxy groups) attached to different carbon atoms with (b) a hydroxyalkyl-substituted 1,3-cyclic acetal having in the 2-position an alpha-methylenically unsaturated substituent.

A third required component of the coating compositions of this invention is a siccative metallic drier compound. These compounds are the well-known siccative metal-containing compounds or complexes which are commonly added to drying and semi-drying oil-containing paints, varnishes, enamels and the like to impart air-drying properties thereto or to improve the air-drying properties. Suitable metals are, for example, cobalt, lead, manganese, zinc, iron, nickel, chromium, cerium, calcium, aluminum, titanium, zirconium and magnesium. They are widely available and commonly used in the form of soluble soaps, salts and the like, such as the chlorides, acetates, hydrates, oxyhydrates, octoates, oleates, linoleates, naphthenates, resinates and alkyl half esters of dicarboxylic acids (e.g. alkyl phthalate). Mixtures of such compounds can be used. Cobalt is a preferred metal.

The amount of metallic drier compound used is not critical and varies widely with the kind of metal, the character of the air-drying film-former(s) being used, the air-drying speed desired, and the air temperature.

Metallic drier compounds which are soluble in the composition are preferred although it is usually expedient to add the drier as a solution in a common solvent.

Ordinarily the amount of metal drier compound used is equivalent to 0.0005%–3% of metal (in the drier)

based on the total weight of air-drying film-forming material. When drying is to occur at normal room or atmospheric temperature, the amount of metal used is preferably about 0.01%–1.0%. When force-drying or baking is employed to shorten the drying period, the preferred amount of metal used is preferably 0.0005–0.01%.

Thus the new coating compositions of this invention consist essentially of cyclic acetal, tertiary alkyl primary amine and drier, each as described hereinbefore.

Although many useful compositions of this invention can be made using one or more of the above mentioned acetal compounds as the only class of air-drying film-former in the composition, other well-known film-formers can be used in admixture with the essential cyclic acetal component to modify film and application properties.

Representative kinds of these film-forming additives are the unsaturated triglyceride oils such as linseed, soya, chinawood, perilla, dehydrated castor, safflower and oiticica oils, oleoresinous varnishes and alkyd resins modified with or embodying such oils or the fatty acid moieties normally contained in such oils, and mono and poly carboxylic acid esters of dihydropyranyl methanol. For coating compositions of this invention which can cure slowly by air-drying and which are normally baked or force dried at an elevated temperature to hasten the cure, the additives can also include alkyd resins modified with unsaturated oils (or the corresponding fatty acids) of the so-called non-drying class such as castor and coconut oil, epoxy resins such as the condensation products of an epihalohydrin and diphenol, amine-aldehyde resins such as alkylated urea formaldehyde and alkylated triazine formaldehyde resins.

A further class of film-forming material which is useful in modifying the film and application properties of the coating compositions of this invention is mono-acetals containing a single 1,3-cyclic acetal radical having in the 2-position an alpha-methylenically unsaturated substituent. Examples of such modifiers are (2-vinyl-1,3-dioxolan-4-yl-butyl) pelargonate, (2-vinyl-1,3-dioxolan-4-yl-methyl) benzoate, and the corresponding oleates and stearates of each of these.

Other common ingredients of organic coating compositions can be included in the manner and proportions well-known in the coating art. These include solvents and diluents, plasticizers, catalysts, hardeners, surface active agents and the like. Of these, solvent or solvent-diluent mixture is the most likely to be needed—to reduce the viscosity or consistency so that it is suitable for easy application, such as by spraying. Suitable solvents and diluents include aliphatic and aromatic hydrocarbons, esters, ketones and alcohols, and mixtures thereof.

Conventional pigments and extenders such as metal oxides, hydroxides, chromates, silicates, sulfides, sulfates, carbonates, organic dyes and lakes thereof and metal-flake pigments can be used, if desired, in the coating compositions of this invention in conventional amounts.

The following examples illustrate the principles and practice of this invention. It is to be understood that, since only a few representative embodiments are shown, other embodiments which yield analogous results can be easily prepared by substituting for all or part of a component in a specific example an equivalent proportion of a corresponding component suggested hereinbefore, with appropriate adjustments if necessary in the proportions or other conditions. Unless otherwise indicated, parts are given by weight.

In the examples of coating compositions containing pigment, it is to be understood that the pigment is incorporated by any convenient one of the conventional grinding or dispersion methods known to persons skilled in the coating art. Usually the pigment is worked in a mill with part of the film-former until a smooth dispersion having the desired fineness is produced. Then the balance of the formula is admixed therewith. Since this is well-known, the following examples are not burdened with detail in this connection and show only the ingredients and amounts. Unpigmented (clear) compositions of the examples are made by simply admixing the specified ingredients.

EXAMPLE 1

*Brushing primer for steel*

| | Parts by wt. |
|---|---|
| Bis[(2-vinyl-1,3-dioxolan-4-yl) butyl]itaconate | 712 |
| (2-vinyl-1,3-dioxolan-4-yl-butyl) oleate | 612 |
| Tetrahydrofurfuryl methacrylate | 355 |
| 43% dehydrated castor oil modified alkyd resin solution, 56% solids | 761 |
| Red lead | 2952 |
| Iron oxide | 4924 |
| Aluminum stearate | 44 |
| Cobalt butyl phthalate solution (4% cobalt) | 54.7 |
| Zirconium octoate, basic; "Zirco" 6% zirconium | 72 |
| Accelerator (footnotes a, b). | |

[a] When the accelerator in the above formula is 10 parts of 2-amino-2,4,4-trimethylpentane, a brushed-out coating dries tack-free in about 4 hours in air at 77° F. A "control" (same formula without accelerator) tested at the same time requires about 7 hours.

[b] When the accelerator in the above formula is 5 parts of 1-amino-1,1-dimethyl ethane (i.e., t-butylamine), the tack-free time is slightly less than 5 hours.

These reductions in drying time are 43% and 29% respectively of the drying time of the "control" under the same drying conditions.

Reductions of about 10%–50% are produced in the air-drying time or in the force-drying or baking time of the coating compositions of the following Examples 2–9 when a tertiary alkyl primary amine set forth hereinbefore is incorporated in the formula in the proportion indicated, and a coating is applied to an article in the manner indicated by the prescribed utility of the composition. As in Example 1, the degree of improvement is based on the drying time of the corresponding "control" (without accelerator).

EXAMPLE 2

*Metal primer for dip application*

| | Parts by wt. |
|---|---|
| Bis[2-vinyl-1,3-dioxolan-4-yl) butyl]itaconate | 313 |
| (2-vinyl-1,3-dioxolan-4-yl-butyl)pelargonate) | 83 |
| 63% Linseed oil modified alkyd resin | 83 |
| Brown iron oxide | 347 |
| Zinc chromate | 258 |
| Calcium carbonate | 75 |
| Talc | 38 |
| Cobalt naphthenate solution (6% cobalt) | 5 |
| Accelerator | 2 |

EXAMPLE 3

*Enamel for brush or spray application*

| | Parts by wt. |
|---|---|
| Bis[(2-vinyl-1,3-dioxolan-4-yl) butyl]orthophthalate | 580 |
| Bis[(2-vinyl-1,3-dioxolan-4-yl) butyl]itaconate | 200 |
| Titanium dioxide | 100 |
| Ferrite yellow | 63 |
| Phthalocyanine green | 50 |
| Cobalt octoate solution (8% cobalt) | 10 |
| Accelerator | 2 |

EXAMPLE 4

*Enamel for brush or spray application*

| | Parts by wt. |
|---|---|
| Bis[(2-vinyl-1,3-dioxolan-4-yl) butyl]sebacate | 480 |
| Bis[(2-vinyl-1,3-dioxolan-4-yl) butyl]itaconate | 160 |
| Titanium dioxide | 356 |
| Cobalt butyl phthalate (8% cobalt) | 8 |
| Accelerator | 2.5 |

EXAMPLE 5

*Clear varnish for brushing on wood*

| | Parts by wt. |
|---|---|
| Bis[(2-vinyl-1,3-dioxolan-4-yl) butyl]fumarate | 1000 |
| Bis[(2-vinyl-1,3-dioxolan-4-yl) butyl]itaconate | 2000 |
| Ester gum | 1000 |
| Mineral spirits | 3000 |
| Cobalt octoate solution (8% cobalt) | 37 |
| Accelerator | 20 |

EXAMPLE 6

*Aesosol self-spraying enamel in pressurized container*

| | Parts by wt. |
|---|---|
| Bis[(2-vinyl-1,3-dioxolan-4-yl) butyl]orthophthalate | 252 |
| Bis[(2-vinyl-1,3-dioxolan-4-yl) butyl]itaconate | 252 |
| Titanium dioxide | 389 |
| Toluene | 33 |
| Acetone | 60 |
| Cobalt butyl phthalate solution (8% cobalt) | 9 |
| Benzoyl peroxide | 5 |
| CCl$_3$F propellent | 500 |
| CCl$_2$F$_2$ propellent | 500 |
| Accelerator | 2.5 |

EXAMPLE 7

*Enamel for spray application*

| | Parts by wt. |
|---|---|
| Bis[(2-vinyl-1,3-dioxolan-4-yl) butyl]itaconate | 252 |
| Cyclic acetal polymer solution | 720 |
| Titanium dioxide | 389 |
| Cobalt octoate solution (8% cobalt) | 0.5 |
| Accelerator | 2.5 |

35% solution in xylene, 55:45 styrene:ethyl acrylate preformed polymer solution with ethyl radicals replaced via transesterification with 4-hydroxybutyl-2-vinyl-1,3-dioxolane. Polymer contains 33.8% by weight of 2-vinyl-1,3-dioxolan-4-yl) butyl moiety.

EXAMPLE 8

*Baking metal primer for dip application*

| | Parts by wt. |
|---|---|
| Bis[(2-vinyl-1,3-dioxolan-4-yl) butyl]itaconate | 105 |
| (2-vinyl-1,3-dioxolan-4-yl-butyl) oleate | 88 |
| Epoxide resin, "Epon" 828 | 19 |
| Urea formaldehyde resin, "Uformite" F240N | 92 |
| Zinc oxide, zinc chromate | 80 |
| Inert fillers | 264 |
| Carbon black | 38 |
| 42% dehydrated castor oil modified alkyl resin | 119 |
| Cobalt octoate solution (6% cobalt) | 1 |
| Accelerator | 2 |

(Baking schedule, 30 minutes at 275° F.)

EXAMPLE 9

*Black baking enamel for spray application*

| | Parts by wt. |
|---|---|
| Bis [(2-vinyl-1,3-dioxolan-4-yl) butyl] maleate | 100 |
| 37% coconut oil modified alkyl resin solution, 50% solution in toluene | 1200 |
| Butylated urea formaldehyde resin solution, 50% solution in butanol | 600 |
| Carbon black | 50 |
| Cobalt octoate solution (6% cobalt) | 6.7 |
| Accelerator | 6.5 |

(Baking schedule, 20 minutes at 325° F.)

I claim:

1. An air-drying liquid coating composition consisting essentially of
   (a) a compound containing a plurality of 1,3-cyclic acetal radicals connected through an interposed polyvalent radical, said cyclic acetal radicals having an alpha-methylenically unsaturated substituent in the 2-position,
   (b) a siccative metallic dried compound, and
   (c) from 0.05–1%, by weight, of a tertiary alkyl primary amine having the following structural formula:

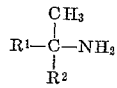

in which

R$^1$ is a C$_1$–C$_5$ alkyl radical, and
R$^2$ is selected from the class consisting of C$_1$–C$_{18}$ alkyl, C$_2$–C$_{18}$ alkenyl and benzyl.

2. A composition of claim 1 in which the tertiary alkyl primary amine of (c) is 2-amino-2,4,4-trimethylpentane.

3. A composition of claim 1 in which the compound of (a) is a polycarboxylic acid ester having a plurality of monovalent 2-vinyl-1,3-dioxolanyl radicals.

4. A composition of claim 1 in which the compound of (a) is a dicarboxylic acid diester having two monovalent 2-vinyl-1,3-dioxolanyl radicals.

5. A composition of claim 1 in which the compound of (a) is bis[(2-vinyl-1,3-dioxolan-4-yl)-butyl] orthophthalate.

6. A composition of claim 1 in which the compound of (a) is bis[(2-vinyl-1,3-dioxolan-4-yl)-butyl] itaconate.

7. A composition of claim 1 in which the siccative metallic drier compound of (b) is a cobalt compound.

8. A composition of claim 1 further containing (d) an air-drying film-forming material selected from the class consisting of unsaturated triglyceride oils, varnishes and alkyd resins modified therewith, and monocarboxylic fatty acid esters containing the 2-vinyl-1,3-dioxolanyl radical.

References Cited by the Examiner

UNITED STATES PATENTS

| 2,937,203 | 5/60 | Fuller | 260—32.6 |
| 2,961,331 | 11/60 | Wheeler | 106—264 |
| 3,010,924 | 11/61 | Ikeda | 260—23.5 |

LEON J. BERCOVITZ, *Primary Examiner.*

DONALD E. CZAJA, *Examiner.*